United States Patent [19]

McCarthy et al.

[11] 4,320,388
[45] Mar. 16, 1982

[54] TWO WIRE OPTICAL DATA COMMUNICATION SYSTEM

[75] Inventors: Charles C. McCarthy, Baltimore; Mark E. Ackman, Cockeysville, both of Md.; Wayne L. Dufek, North Hopewell, Pa.; Edward E. Kopicky, Bel Air, Md.

[73] Assignee: Westinghouse Electric Corp., Pittsburgh, Pa.

[21] Appl. No.: 168,998

[22] Filed: Jul. 15, 1980

[51] Int. Cl.³ .......................... H04Q 9/00; H03K 3/42
[52] U.S. Cl. .................. 340/825.54; 307/117; 455/613; 340/825.62
[58] Field of Search ............... 340/172, 167 A, 152 R, 340/166 R; 455/613; 307/117, 311

[56] References Cited
U.S. PATENT DOCUMENTS

| | | | |
|---|---|---|---|
| 3,895,241 | 7/1975 | Cooper | 307/117 |
| 3,959,772 | 5/1976 | Wakasa et al. | 340/167 A |
| 4,081,787 | 3/1978 | Lee | 340/172 |
| 4,107,474 | 8/1978 | Schneider | 340/166 R |
| 4,176,401 | 11/1979 | Lonberger | 455/613 |

*Primary Examiner*—Donald J. Yusko
*Attorney, Agent, or Firm*—D. Schron

[57] ABSTRACT

A control station in data communication with a plurality of remote stations, each remote station including a receiving opto-isolator device and a transmitting opto-isolator device, each having an LED and an associated light detector. The LED of the receiving opto-isolator is in series circuit arrangement with the detector of the transmitting opto-isolator. A single remote station may be provided or a plurality of remote stations either in series or parallel circuit configuration. If in series configuration, a bypass circuit may be provided in the event of a failure of a particular remote station.

7 Claims, 5 Drawing Figures

TWO WIRE OPTICAL DATA COMMUNICATION SYSTEM

BACKGROUND OF THE INVENTION

1. Field of the Invention

Two-way data communication system utilizing optical isolating circuitry.

2. Description of the Prior Art

A number of systems exist wherein apparatus at a central location interrogates apparatus at remote locations with the subsequent transmission of data from these remote locations back to the central location.

For example, in a nuclear power generating complex, hundreds of remote stations may be located throughout the complex for gathering, by means of sensors, data relative to radiation levels, pressures, temperatures, and wind and fluid flows, to name a few. Each of the remote stations includes a computer means for handling the data and for transmitting such data back to a central control room for display and interpretation.

Any communications link between a remote station and the central station must be simple, reliable, and must allow for ground potential differences between the stations. To this end, use is made of optical isolating circuits, or opto-isolators to allow for not only ground potential differences but to provide high noise immunity. The technique utilized includes two cables for each separate link with a remote station, with each cable including a shielded pair of lines with one cable being for interrogation of a remote station and the other cable being for the transmission of data from that remote station to the central control.

It would be desirable to minimize the cable requirements for such installation without degrading performance. The present invention accomplishes these objectives.

SUMMARY OF THE INVENTION

A data communication system is provided which includes a control station and a remote station which receives requests for information from the control station and transmits data back in conformance with the request. One or more remote stations may be included with each having data processing means and a receiving opto-isolator in addition to a transmitting opto-isolator. The receiving opto-isolator has an optical transmitter element for receiving and passing an electrical signal from the control station and for transmitting an optical signal in response to the electrical signal. It additionally includes a detector which detects the optical signal to produce an output signal indicative thereof to the data processing means. The transmitting opto-isolator similarly includes an optical transmitting element which transmits an optical signal in response to an electrical signal governed by the data processing means within the station and additionally includes a detector which detects the optical signal for allowing electrical signals to be gated. The optical transmitter element of the receiving opto-isolator is connected in series circuit arrangement with the detector of the transmitting opto-isolator such that the electrical signal in the line is modulated by the turning on and off of the detector. The control station includes a receiver means and the modulated signal is provided to such receiver means.

DESCRIPTION OF THE PREFERRED EMBODIMENT

Figure 1:
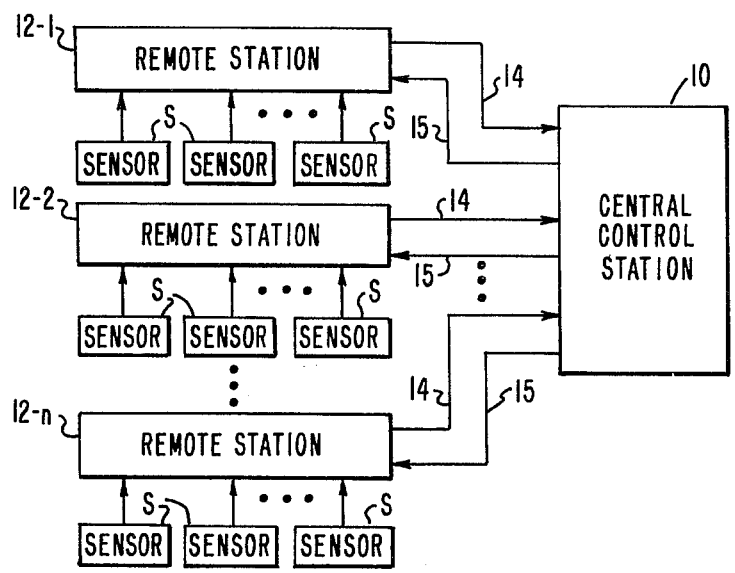
FIG. 1 is a block diagram of a typical installation requiring a communication link.

Referring now to FIG. 1, a typical installation includes a central control system 10 in communication with a plurality of remote stations 12-1, 12-2-12-n, each for gathering and processing information provided by a plurality of different sensors S.

The communication link includes shielded two-wire, cables 14 connecting the control station with opto-isolators within the respective remote stations for transmitting, for example, requests for information. The requested information is then transmitted back to respective opto-isolators in the central control station by means of two-wire, shielded cables 15.

In a large nuclear power generating complex, it would be desirable to minimize the amount of wire utilized not only from an installation standpoint, but from a cost standpoint. Cables such as 14 and 15 must meet stringent requirements with respect to radiation and flammability. Not only must the cable be non-flammable, it may not be made of material that gives off dense smoke when heated. Accordingly, such cable tends to be very expensive and in the complex which includes hundreds of remote stations, hundreds of feet away from the control station, the elimination of just half the cabling can represent a significant savings.

Figure 2:
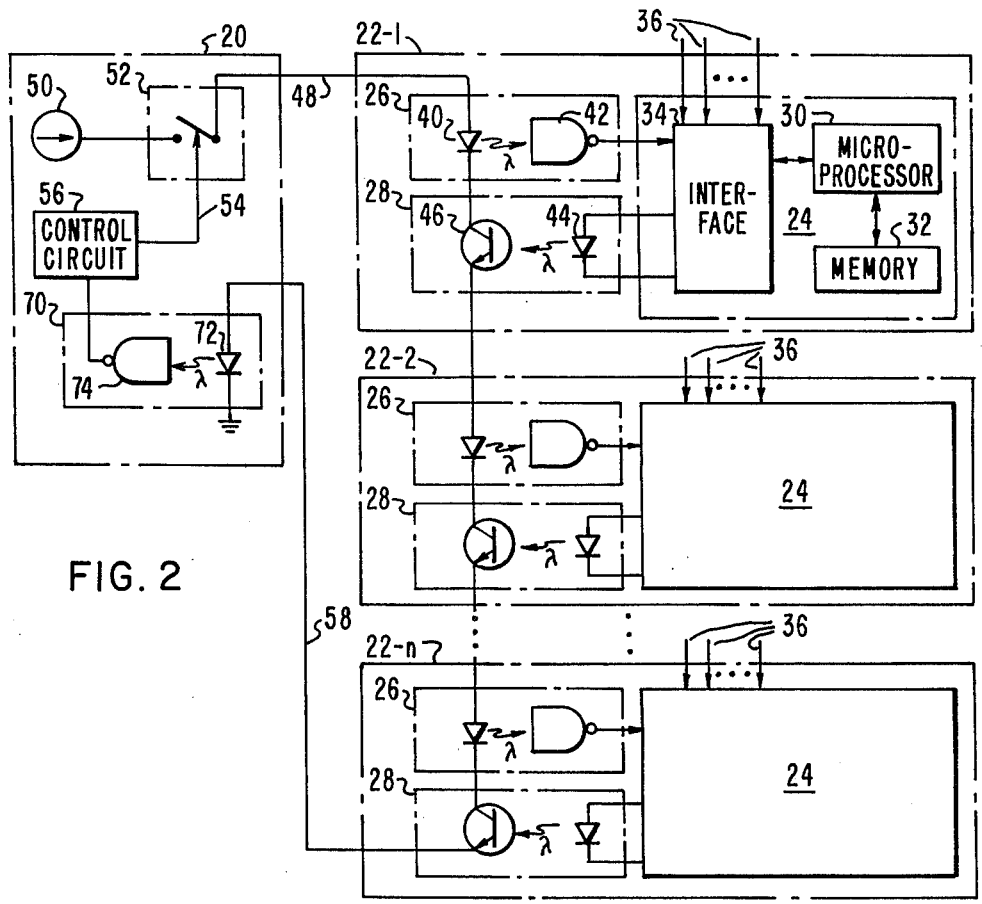
FIG. 2 is a block diagram of a preferred embodiment of the present invention.

FIG. 2 illustrates an embodiment of the invention which substantially reduces the amount of cable needed to accomplish data communication in such systems. The arrangement includes the central control station 20 in communication with the plurality of remote stations 22-1, 22-2-22-n.

For purposes of illustration, all of the remote stations are substantially identical and include data processing means 24, a receiving opto-isolator 26 and a transmitting opto-isolator 28, as illustrated in remote station 22-1.

The data processing means basically includes a microprocessor 30 in communication with both a memory 32 and interface circuitry 34 which additionally receives a plurality of individual sensor signals by means of leads 36, such arrangement being well known standard equipment for a typical installation.

The receiving opto-isolator 26 includes an optical transmitting element 40, operable when supplied with current to transmit an optical signal to a detector 42, the output of detector 42 being provided to the data processing means 24. Opto-isolator 26 is a well-known item available commercially under the designation 6N137, and wherein the optical transmitting element is in the form of a light-emitting diode (LED) although many other similar devices are also suitable.

Similarly, opto-isolator 28 includes an LED 44 operable to transmit an optical signal to a detector 46, such opto-isolator being a commercially-available item, one example of which is a product of Monsanto Corporation under the designation MCT2.

Current is supplied to LED 40 via line 48 from a current generator 50, the current being modulated on and off by means of a gate circuit 52 in accordance with a control signal applied at lead 54 from control circuit 56. In operation, the control signal on lead 54 opens and closes gate 52 so that the current on line 48 assumes binary one and zero values in accordance with a current/no current situation.

Current for driving LED 44 is derived from the data processing means 24 and detector 46, in series circuit arrangement with LED 40, will modulate the current in line 48 in accordance with the optical signal received from LED 44.

Until specifically addressed, the data processing means of the respective remote stations are programmed to continuously provide current to the LED of the transmitting opto-isolator (LED 44) so that all of the respective detector circuits 46 function as closed switches to allow current to pass on to a subsequent remote station. Current is then returned to the control module from the last of the remote stations via line 58. Any signal on line 58 is provided to a receiver means 70, the output signal of which is provided to control circuit 56 for processing and display purposes. In one embodiment, the receiver means 70 may take the form of an opto-isolator having an LED 72 and detector 74, and being of the 6N137 variety. In an actual installation, line 58 may pass back through all prior remote stations so that it, along with line 48, may be provided as one shielded pair of wires in a single cable.

Figure 3:
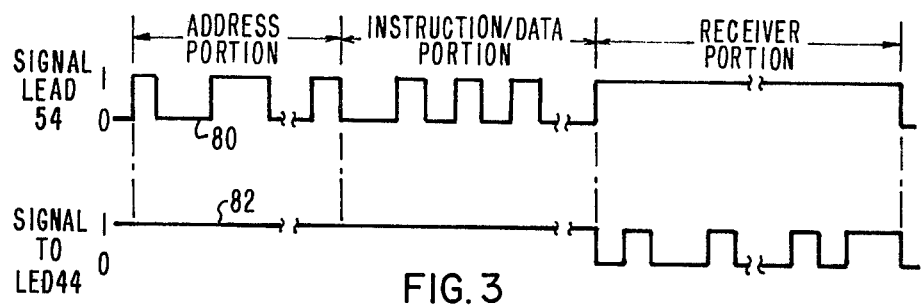
FIG. 3 shows waveforms to aid in an understanding of the operation of the apparatus illustrated in FIG. 2.

In operation, and with additional reference to FIG. 3, let it be assumed that the contents of a particular memory location in one of the remote stations is desired for display in the control station. Each of the remote stations has a unique address and the initial portion of the signal transmitted by the control station to all of the remote stations is the address of the particular remote station to be interrogated.

Waveform 80 of FIG. 3 represents the control signal applied to lead 54 and it is seen that the initial portion of the signal is a series of ones and zeros corresponding to the unique address of one of the remote stations. Let it be assumed for the purpose of illustration that remote station 22-1 is to be addressed. In response to the initial portion of waveform 80, LED 40 transmits the binary address code to its detector 42. Since, at this point, LED 44 is continuously emitting a light signal, detector 46 will pass the current through to the subsequent station where it, as well as the remaining stations, will receive the same address signal. However, only the addressed station 22-1 will respond to the address signal such that the data processing means is primed to receive the next portion of the transmitted signal, which portion is an instruction and/or data portion, which in the instant example, is a request for information at a particular memory location. During this instruction/data portion, waveform 82 remains in a high condition such that LED 44 continues emitting its optical signal.

During the receive portion of waveform 80, that is, the portion where control station 20 is to receive the information from station 22-1, a high signal remains on lead 54 so that current is supplied to the remote station array whereas, as illustrated by waveform 82, the signal to LED 44 will vary in accordance with the data being transmitted. Waveform 82 for the remaining unaddressed stations will remain in the high condition so as to allow the signal to be transmitted back to the control station.

In response to the turning on and off of LED 44 in accordance with the data to be transmitted, detector 46 in turn turns on and off thus modulating the current in line 48. This turning on and off of detector 46 by the signal from LED 44 also has the effect of likewise turning on and off LED 40 so that detector 42 will provide the identical signal as is being transmitted back to the control station so that the remote station data processing means, if desired, may confirm that a proper transmission is taking place.

In addition to extracting information from a particular remote station, the apparatus is also operable, by varying the code signal applied to lead 54, to address a particular remote station for placing information into a particular memory location of its data processing means.

Figure 4:
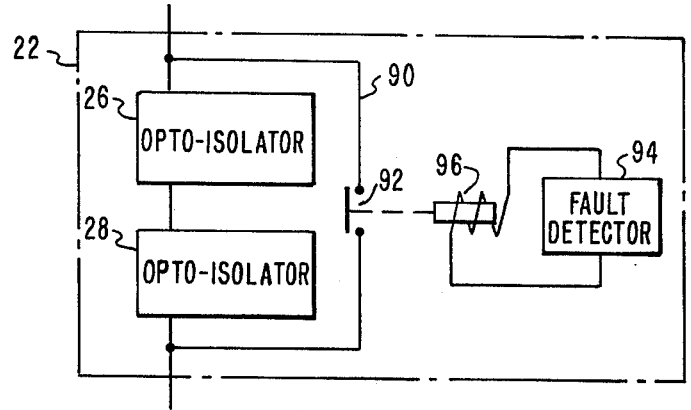
FIG. 4 is a block diagram of a single module of FIG. 2 illustrating an additional safety feature.

For the arrangement illustrated, not only is the LED 40 in series circuit arrangement with detector 46 in each remote station, but the remote stations themselves are in series circuit arrangement, with the detector of the transmitting opto-isolator being in series with the LED of the receiving opto-isolator of a subsequent control station. With this arrangement, if one of the control stations should experience a failure, total communication between the central control and remote control stations would be destroyed. To obviate this situation, and as illustrated in FIG. 4, a typical remote station 22 includes a bypass path 90 having normally open contacts 92, the arrangement bypassing the receiving and transmitting opto-isolators 26 and 28. Means such as a fault detector 94 may provide current through coil 96 to maintain the contacts 92 in their open state and if a fault should occur to thereafter interrupt such current to close the contacts 92 to, in essence, take the remote station 22 out of the signal path so that operation may continue with the remaining stations.

Figure 5:
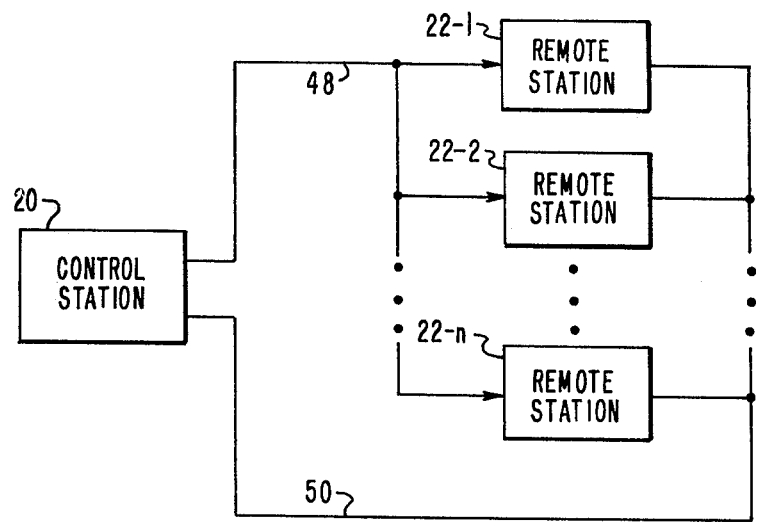
FIG. 5 illustrates an alternate lay-out of modules.

Alternatively, and as illustrated in FIG. 5, the remote stations 22-1 through 22-n may be connected in parallel circuit configuration, however, with each transmitting element of the receiving opto-isolator and each detector element of the transmitting opto-isolator being in series circuit arrangement as previously described. The arrangement of FIG. 5 would require the use of more cable, however, the amount would still be far less than would normally be used.

Although the present invention has been described with reference to a nuclear power plant complex, the invention is applicable to a variety of systems wherein data communication must be established between a central location and one or more remote stations.

What is claimed is:

1. A data communication system comprising:
  (a) a control station including means to request information from a remote station by transmitting a predetermined code over a first single wire, to said remote station, and being operable to receive information transmitted from a remote station over a second single wire;
  (b) at least one remote station operable to receive a request for information from said control station and for providing said requested information;
  (c) said remote station including data processing means and a receiving opto-isolator having: (i) an optical transmitter element for receiving and passing an electrical signal transmitted from said control station over said first single wire, for transmitting an optical signal in response to said electrical signal; and (ii) a detector for detecting said optical signal to provide an output signal indicative thereof to said data processing means;

(d) said remote station also including a transmitting opto-isolator having: (i) an optical transmitter element for transmitting an optical signal in response to an electrical signal governed by said data processing means; and (ii) a detector for detecting said last named optical signal for allowing electrical signals to be passed by said last named detector;

(e) said optical transmitter element of said receiving opto-isolator being connected in series circuit arrangement with said detector of said transmitting opto-isolator such that the electrical signal through said series connected transmitter element is modulated by said detector;

(f) said control station including receiver means; and (g) means for providing said modulated signal to said receiver means over said second single wire.

2. Apparatus according to claim 1 which includes:

(a) a plurality of remote stations each including data processing means and receiving and transmitting opto-isolators in the same relationship as said one remote station.

3. Apparatus according to claim 2 wherein:

(a) the detector of a transmitting opto-isolator of one of said remote stations is in series circuit arrangement with the transmitting element of the receiving opto-isolator of a subsequent one of said remote stations.

4. Apparatus according to claim 2 wherein:

(a) said remote stations are in parallel circuit configuration so that each detector element of a transmitting opto-isolator is connected directly to said control station.

5. Apparatus according to claim 1 which includes:

(a) an electrical path connected in parallel with said series circuit arrangement;

(b) said path including normally open contacts; and (c) means for closing said contacts upon a predetermined fault within said remote station.

6. Apparatus according to claim 1 wherein:

(a) said receiver means includes a receiving opto-isolator having: (i) an optical transmitter element for transmitting an optical signal in response to a signal from said remote station; and (ii) a detector for detecting said optical signal.

7. Apparatus according to claim 3 wherein:

(a) said receiver means includes a receiving opto-isolator having: (i) an optical transmitter element for transmitting an optical signal in response to a signal from a last of said remote stations; and (ii) a detector for detecting said optical signal.

* * * * *